United States Patent [19]

Hara

[11] Patent Number: 4,671,617

[45] Date of Patent: Jun. 9, 1987

[54] LIQUID CRYSTAL DAZZLE-FREE REFLECTION MIRROR

[75] Inventor: Kunihiko Hara, Aichi, Japan

[73] Assignee: Nippondenso Co., Ltd., Kariya, Japan

[21] Appl. No.: 762,837

[22] Filed: Aug. 6, 1985

[30] Foreign Application Priority Data

Aug. 8, 1984 [JP] Japan ................... 59-166831

[51] Int. Cl.$^4$ ............... G02F 1/13; G02F 1/01; G02B 17/00

[52] U.S. Cl. .................. 350/335; 350/278; 350/338; 350/349; 350/357

[58] Field of Search ......... 350/331 R, 332, 338, 350/342, 335, 349, 357, 278, 283

[56] References Cited

U.S. PATENT DOCUMENTS

| | | | |
|---|---|---|---|
| 3,280,701 | 9/1961 | Donnely | 350/357 |
| 3,967,881 | 7/1976 | Moriyama | 350/335 |
| 4,274,713 | 6/1981 | Krueger | 350/349 X |
| 4,491,390 | 1/1985 | Tong-Shen | 350/331 R X |

FOREIGN PATENT DOCUMENTS

| | | | |
|---|---|---|---|
| 0111907 | 6/1984 | European Pat. Off. | 350/338 |
| 2604462 | 8/1977 | Fed. Rep. of Germany | 350/331 R |
| 3312627 | 10/1984 | Fed. Rep. of Germany . | |
| 0042753 | 4/1978 | Japan . | |
| 0018925 | 1/1984 | Japan . | |
| 2029343 | 3/1980 | United Kingdom | 350/278 |

Primary Examiner—John K. Corbin
Assistant Examiner—David Lewis
Attorney, Agent, or Firm—Cushman, Darby & Cushman

[57] ABSTRACT

A liquid crystal type dazzle-free reflection mirror has a scattering type liquid crystal cell such as DSM liquid crystal switching the orientation of the liquid crystal molecular axis thereof between a random orientation and a regular orientation depending on an electric field applied thereto. At least one coloring filter cell such as guest-host liquid crystal provided at a front side of the scattering type liquid crystal cell to which light is incident and switching, depending on an electric field applied thereto, between two light transmitting states in which white light is transmitted and specific color light is transmitted more, respectively. A reflection mirror layer reflecting the light transmitted through the scattering type liquid crystal cell and the coloring filter cell is provided behind the scattering type liquid crystal cell so that a reflection image may be provided on the mirror surface.

9 Claims, 9 Drawing Figures

LIQUID CRYSTAL DAZZLE-FREE REFLECTION MIRROR

BACKGROUND OF THE INVENTION

The present invention relates to a dazzle-free reflection mirror which is capable of electrically changing reflectivity of light by the use of liquid crystal. The dazzle-free reflection mirror according to the present invention may be used mainly as a rear view mirror of an automobile, for example, and advantageous in preventing a driver from being dazzled by a head light beam of the following automobile at night or by the reflection of the sun light being incident from the rear of the vehicle in the daytime.

As a dazzle-free reflection mirror which prevents dazzling of a light by electrically changing the reflectivity of the light, it has been known that a liquid crystal cell is provided in front of the reflection mirror layer, an electric voltage is applied to the liquid crystal cell to control orientation of the molecular axis of the liquid crystal, and the intensity of light reflected by the reflection mirror layer at the rear side of the liquid crystal cell is controlled by changing the transmittivity or the absorption of light transmitted through the liquid crystal cell. As this liquid crystal, N-type nematic liquid crystal which provides dynamic scattering, a twist-nematic liquid crystal or guest-host liquid crystal which controls polarization of light is used.

However, in the dazzle-free reflection mirror using the dynamic scattering effect is disadvantageous in that the mirror surface turns white and picture image on the mirror surface cannot be recognized with ease because of dynamic scattering under dazzle-free condition.

The dazzle-free reflection mirror using the twist-nematic or guest-host type liquid crystal uses a polarizer or an analyzer to control polarization of light. For this reason, under non-dazzle-free condition, the polarized light only in one direction is reflected and the picture image on the mirror surface becomes dark, the image is distorted in dependence on the angle the driver sees the mirror, and the visible angle in which the image can be recognized on the mirror surface is narrowed.

To overcome the above-described disadvantages in the prior art, the present inventors have suggested a dazzle-free reflection mirror which has a liquid crystal mixed with dichroic pigment having optical anisotrophy so that scattered light may be absorbed by the dichroic pigment ITO U.S. application Ser. No. 561,921, filed on Dec. 15, 1983, now abandoned. However, the reflection mirror having DSM (dynamic scattering mode) liquid crystal mixed with dichroic pigment as described in the above patent application is a current injection type and, therefore, it is likely that the pigment is deteriorated by the current and operation characteristic of the reflection mirror is deteriorated. In addition, since the molecular axis of the pigment is oriented at randam due to random orientation of the liquid crystal molecules, efficiency of absorption of light scattered by the liquid crystal molecules is low and more pigments to be mixed are necessitated.

SUMMARY OF THE INVENTION

It is an object of the present invention to overcome the above-described disadvantages and to provide a more easily recognizable reflection image under dazzle-free condition.

The dazzle-free reflection mirror according to the invention has a scattering type liquid crystal cell switching the orientation of a liquid crystal molecular axis thereof between a random orientation and a regular orientation depending on an electric field applied thereto, at least one coloring filter cell provided at a front side of scattering type liquid crystal cell to which light is incident and switching, depending on an electric field applied thereto, between two light transmitting states in which white light is transmitted (the light is not colored) and specific color light is transmitted more (the light is colored), and a reflection mirror layer reflecting the light transmitted through the coloring filter cell and the scattering type liquid crystal cell.

According to the present invention, the scattering type liquid crystal cell and the coloring filter cell are provided in front of the reflection mirror layer. The scattering type liquid crystal cell means a liquid crystal cell in which the molecular axis orientation of which is switched between a random orientation and a regular orientation in dependence on an electric field applied thereto. The scattering mode liquid crystal cell includes dynamic scattering mode (DSM) liquid crystal or phase transition liquid crystal. The DSM liquid crystal generates dynamic scattering in response to the electric voltage applied thereto, so that light is scattered. The phase transition type liquid crystal is kept white when no electric field is applied and scatters light and turns transparent when the electric voltage is applied to arrange molecules as in the twist nematic type. The coloring filter is switched between a state in which white light is transmitted and a state in which a specific light is transmitted more by the application of the electric field. Here it should be noted that the specific color means various colors including black which can be generated by the guest-host liquid crystal with black pigment. For instance, the guest-host liquid crystal cell may be single-layer type or two-layer type. The guest-host liquid crystal cell may employ either horizontal orientation or vertical orientation. When the guest-host liquid crystal cell of two-layer type is used, the molecular axes of each layer oriented horizontally but arranged at 90 degrees to each other. In addition, a liquid crystal cell comprising phase transition liquid crystal mixed with pigment may also be used. Further, by the use of an electrochromic element, transmittivity of white light and the transmittivity of colored light may be electrically controlled.

DETAILED DESCRIPTION OF THE PREFERRED EMBODIMENTS

The present invention will be described in detail with reference to accompanying drawings.

Figure 1A:
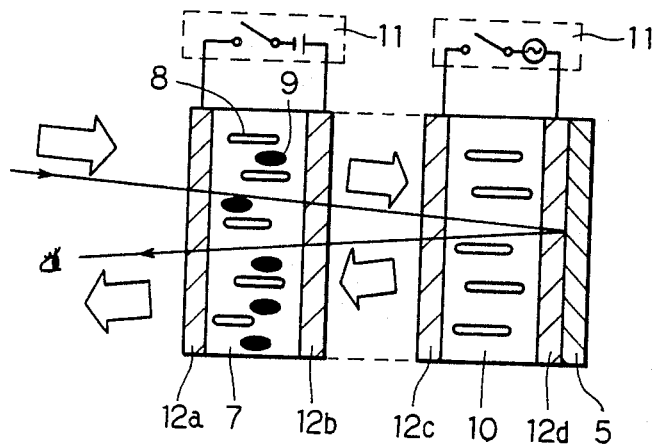
FIGS. 1a and 1b are schematic views showing a concept of the present invention.
Figure 1B:
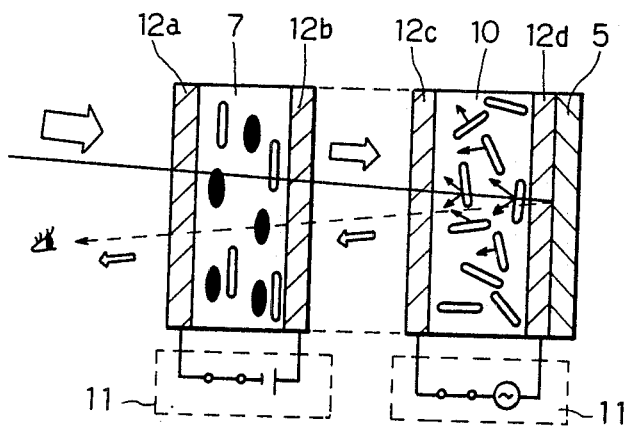

Reference is made first to FIGS. 1a and 1b showing a basic structure of the present invention. FIGS. 1a and 1b show non-dazzle-free condition and dazzle-free condition, respectively.

Numeral 5 designates a reflection mirror layer comprising aluminum or nickel. Numeral 10 designates a scattering type liquid crystal cell such as DSM (dynamic scattering mode) liquid crystal. Numerals 12a, 12b, 12c and 12d designate electrodes in the form of transparent conductive films. Numeral 7 designates a coloring filter cell such as guest-host liquid crystal. Numeral 8 designates nematic liquid crystal molecules, and 9 dichroic pigment molecules mixed with the nematic liquid crystal molecules 8. Numeral 11 designates a voltage source which applies electric voltages to the cells 10 and 7 when a dazzle-free operation is desired. Switching on and off the electric voltages to the cells 10 and 7 may be made responsive to the incident light. The electric voltage applied to the cell 7 may be an alternating current voltage.

As shown in FIG. 1a, the coloring filter cell 7 is oriented vertically relative to the electrodes 12a and 12b when no electric voltage, and hence no electric field, is applied across the electrodes 12a and 12b. For this reason, the incident light is not absorbed by the coloring filter cell 7 but is transmitted to the scattering type liquid crystal cell 10 which is in regular orientation with no electric field applied thereto. Thus, the light is not scattered but transmitted through the cell 10. Thereafter, the light is reflected by the reflection layer 5 and is radiated from the front surface of the mirror after having been transmitted in the opposite direction. As a result, the reflection mirror provides a very high reflectivity of light and provides a bright reflection image.

On the other hand, as shown in FIG. 1b, the liquid crystal molecules 8 and pigment molecules 9 of the coloring filter cell 7 are oriented horizontally relative to the electrodes 12a and 12b when the electric voltage is applied across the electrodes 12a and 12b while the liquid crystal cell 10 generates a dynamic scattering or random orientation when the electric voltage is applied across the electrodes 12c and 12d. For this reason, the incident light to the coloring filter cell 7 absorbs the color of the light polarized in the molecular axis of the dichroic pigment 9 and the light transmitted therethrough is colored. Thus the light scattered by the scattering type liquid crystal cell 10 is colored and the image under dazzle-free condition is not white but colored so that the image may be recognized with ease under the dazzle-free condition.

Figure 2:
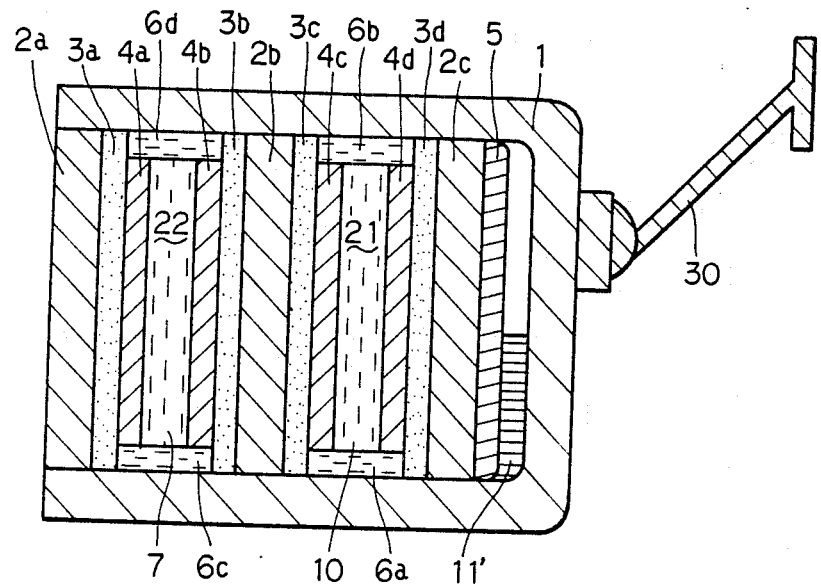
FIG. 2 is a sectional view showing a liquid crystal type dazzle-free reflection mirror according to a first embodiment of the present invention.

FIG. 2 is a sectional view showing a structure of the liquid crystal type dazzle-free reflection mirror according to the first embodiment of the present invention. The dazzle-free reflection mirror has a light-shielding frame 1 and an attachment 30 which attaches the frame 1 to a front wind-shield glass of a vehicle. Within an inner space of the frame 1, the scattering type liquid crystal cell 10 and the coloring filter cell 7 are provided.

The scattering type liquid crystal cell 10 has a pair of transparent glass substrates 2b and 2c arranged in parallel. On the inside surfaces of the substrates 2b and 2c, electrodes 3c and 3d in the form of transparent conductive films comprising ITO are formed by spattering, respectively. On the inside surfaces of the electrodes 3c and 3d, orientation films 4c and 4d are formed by rubbing, respectively so that a nematic liquid crystal 21 is oriented regularly under no electric field condition. The transparent glass substrates 2b and 2c are supported by spacers 6a and 6b to form a cell. The nematic liquid crystal 21 which generates dynamic scattering in response to the electric field is injected into the cell.

The coloring filter cell 7 is provided in front of the transparent glass substrate 2b. Transparent glass substrates 2a and 2b form a cell. Electrodes 3a and 3b in the form of transparent conductive films comprising ITO are formed on the inside surfaces of the transparent glass substrates 2a and 2b and orientation films 4a and 4b are formed on the inside surfaces thereof by rubbing so that a guest-host liquid crystal 22 is oriented vertically to the electrodes 3a and 3b. The guest-host liquid crystal 22 is injected into the cell.

The guest-host liquid crystal 22 and the DSM liquid crystal 21 are oriented vertically relative to the glass substrates 2a, 2b, 2c and 2d by the orientation films 4a, 4b, 4c and 4d under no electric field condition. The electrodes 3a, 3b, 3c and 3d are 100 Å in thickness and the orientation films 4a, 4b, 4c and 4d are 200 Å in thickness. Each cell is 10 micrometers in thickness. Aluminum is vapor-deposited on the rear surface of the transparent glass substrate 2c to form the reflection mirror layer 5. A part of the reflection mirror layer 5 is made semitransparent and, at the rear portion thereof, a photo sensor 11' is provided for detecting the intensity of light incident from the front side. The photo sensor 11' is operatively connected to the voltage source 11 so that the electric voltages are applied to the cells 7 and 10 by the voltage sources (not shown) when intensive light is incident from the front side. The coloring filter cell 7 and the scattering type liquid crystal cell 10 may be manufactured separately by use of separate glass substrates, in stead of using the glass substrate 2b in common, so that they may by attached together.

In the first embodiment, the electric voltages are applied to the scattering type liquid crystal cell 10 and coloring filter cell 10 under dazzle-free condition (Thde incident light is intensive). The liquid crystal 21 of the scattering type liquid crystal cell 10 generates dynamic scattering to cause random orientation and the guest-host liquid crystal 22 with pigment of the coloring filter cell 7 is horizontally oriented. As a result, the incident light transmitted through the coloring filter cell 7 is colored and colors the dynamic scattering liquid crystal 21 at the rear thereof. The image on the mirror surface under the dazzle-free condition is colored so that it turns dark.

Figure 3:
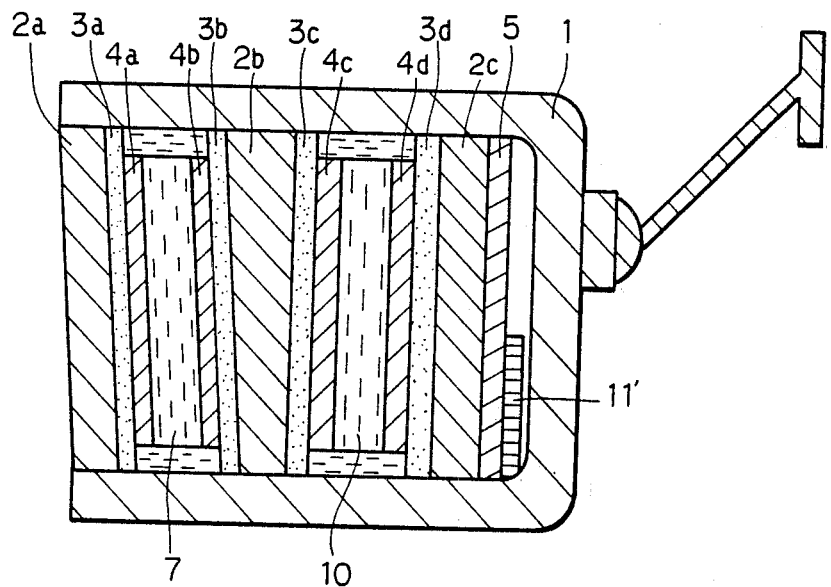
FIGS. 3 and 4 are sectional views showing modifications of the dazzle-free reflection mirror according to the first embodiment shown in FIG. 2.
Figure 4:
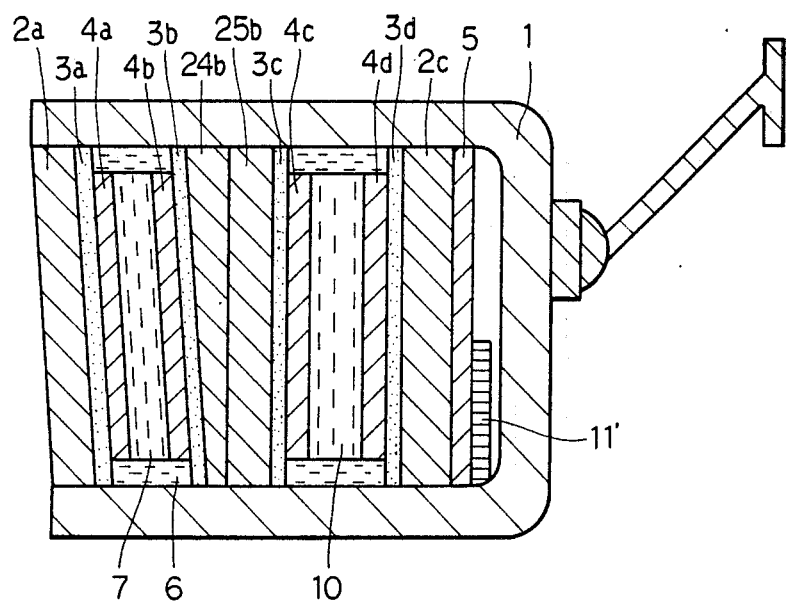

FIG. 3 is a sectional view showing a structure of the dazzle-free reflection mirror according to a modification of the first embodiment. The coloring filter cell 7 is inclined relative to the optical axis so that ghost image under the dazzle-free condition is prevented. FIG. 4 shows a further modification of the first embodiment in which the coloring filter cell 7 inclined and the scattering type liquid crystal cell 10 not inclined are manufactured separately by the use of transparent glass substrates 2a, 24b, 25b and 2c and attached together.

Figure 5:
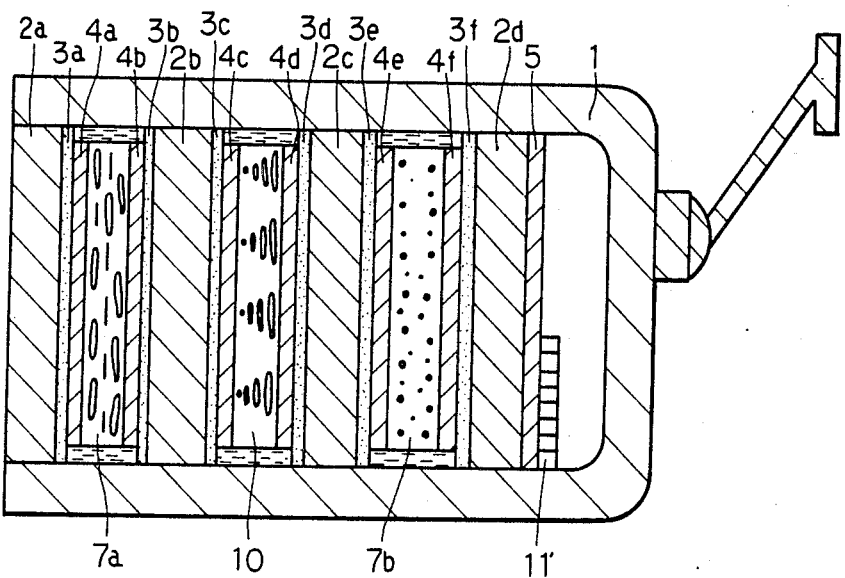
FIGS. 5, 6 and 7 are sectional views showing a dazzle-free reflection mirror according to a second embodiment of the present invention.
Figure 6:
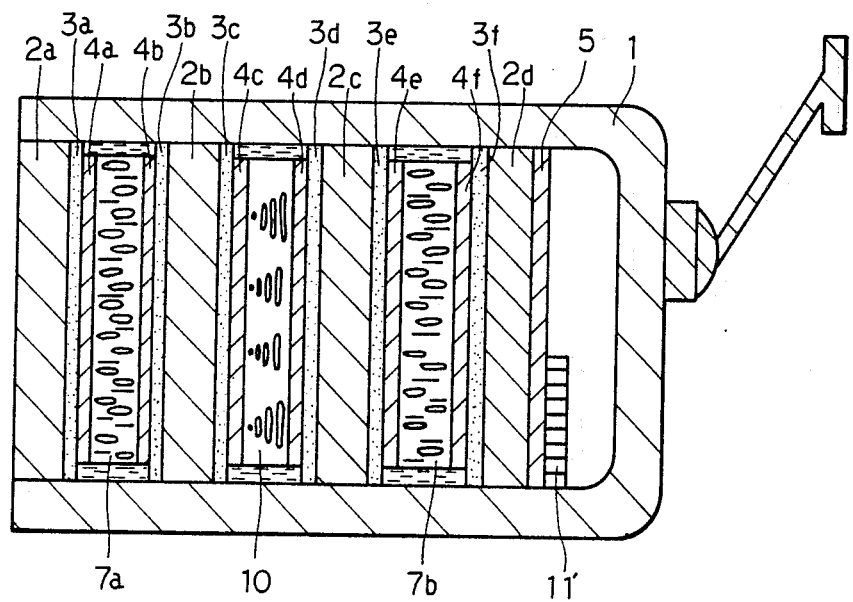
Figure 7:
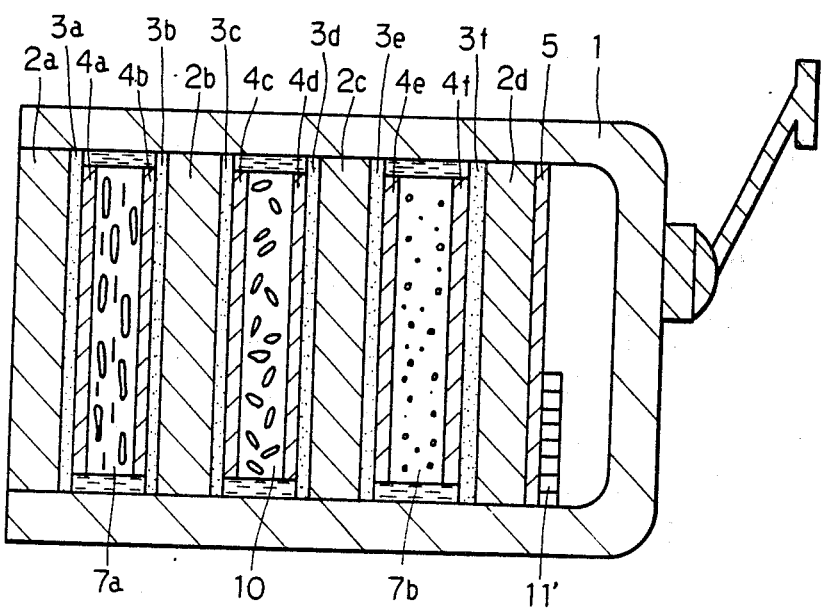

FIGS. 5, 6 and 7 are sectional views showing structures of liquid crystal type dazzle-free reflection mirror according to the second embodiment. In this embodiment, a liquid crystal in twisted orientation or regular orientation under no electric field condition is used as the scattering type liquid crystal cell 10. Guest-host liquid crystal cells 7a and 7b with pigments therein are used as the coloring filter cell 7 and provided on both sides of the scattering type liquid crystal cell 10. The cell 7b comprises electrodes 3e and 3f, orientation films 4e and 4f and guest-host liquid crystal injected therein. The guest-host liquid crystal cells 7a and 7b are horizontally oriented relative to the glass substrates 2a, 2b, 2c and 2d under no electric field condition and the molecular axes thereof are mutually arranged at a right angle.

FIG. 5 shows an arrangement of the molecules under semi-dazzle-free condition. In this instance, no electric voltages are applied to the cells 7a, 7b and 10. Therefore, the incident light is transmitted through the first guest-host liquid crystal cell 7a and the light polarized in the direction of molecular axis is absorbed and only specific light is transmitted. The transmitted light is polarized by 90 degrees by the cell 10 in nematic orientation and made incident to the second guest-host liquid crystal cell 7b. The polarized direction of the white component of the transmitted light is in vertical relation to the orientated direction of the guest-host liquid crystal cell 7b. As a result, the light not absorbed by the first guest-host liquid crystal cell 7b is not absorbed by the liquid crystal cell 7b either and is reflected by the reflection mirror layer 5 provided at the rear thereof. The reflected light is transmitted in the opposite direction without being absorbed by the two guest-host liquid crystal cells 7a and 7b and radiated from the front surface of the mirror. Therefore, the reflected image is colored in half by the pigment. Since only light in one axial direction is absorbed, reflectivity of light is 50% when black pigment is used.

FIG. 6 shows a non-dazzle-free condition. In this instance, electric voltages are applied to the first and second guest-host liquid crystal cells 7a and 7b only so that the molecular axis of the liquid crystal is oriented vertically. As a result no light is absorbed by the guest-host liquid crystal cells 7a and 7b. In this case, reflectivity of light is 100%.

FIG. 7 shows a dazzle-free condition. No electric voltages are applied to the guest-host liquid crystal cells 7a and 7b but an electric voltage is applied to the scattering type liquid crystal cell 10 to generate random orientation. The light transmitted through the first guest-host liquid crystal cell 7a is reduced to 50% relative to the incident light and the reduced light is scattered by the scattering type liquid crystal cell 10. The scattered light is absorbed further by the first and second guest-host liquid crystal cells 7a and 7b so that the light reflected by the reflection mirror layer 5 is not substantially radiated from the transparent glass substrate 2a or the mirror surface. As a result, the reflection image is formed only by the light reflected at the surface portion of the transparent glass substrate 2a so that dazzling of the intensive light is prevented.

Figure 8:
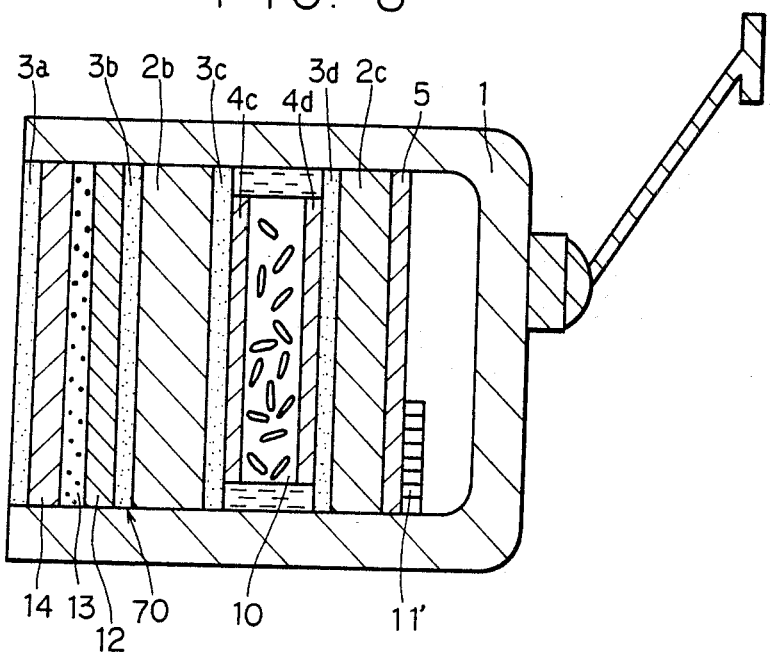
FIG. 8 is a sectional view showing a dazzle-free reflection mirror according to a third embodiment of the present invention.

FIG. 8 shows a sectional view showing a structure of the dazzle-free reflection mirror according to the third embodiment. In this embodiment, an electrochromic element 70 is used as a coloring filter cell. The electrochromic element 70 comprises transparent electrodes 3a and 3b, a tungsten oxide layer 14, tantalum pentoxide insulator layer 13 and indium oxide layer 12. When negative and positive voltages are applied to the transparent electrodes 3a and 3b, respectively, the layers 14 and 12 are colored and exhibit blue color which is effective to prevent dazzling of the intensive light. When voltages in opposite polarity are applied, on the other hand, they are decolored and become transparent. As a result, the reflection image may be recognized with ease by coloring the image on the mirror surface under the dazzle-free condition.

The present invention having been described is not limited to the above-described embodiments but may be modified without departing from the spirit and scope of the invention.

What we claim is:

1. A liquid crystal type dazzle-free reflection mirror comprising:
    a scattering liquid crystal cell switching, depending on an electric field applied thereto, the orientation of liquid crystal molecular axis thereof between a random orientation and a regular orientation;
    a coloring filter cell provided at a front side of said scattering liquid crystal cell to which light is incident and switching, depending on an electric field applied thereto, between two light transmitting states in one and the other of which the light transmitted therethrough is colored and decolored;
    a reflection mirror layer reflecting the light transmitted from said coloring filter cell through said scattering liquid crystal cell; and
    control means responsive to a light incident thereto for controlling the electric fields applied to said scattering liquid crystal cell and said coloring filter cell so that said scattering liquid crystal cell provides the random orientation and the coloring filter cell colors the light when the incident light is intensive.

2. A dazzle-free reflection mirror according to claim 1, wherein said coloring filter cell comprises a guest-host liquid crystal in which liquid crystal molecules and pigment molecules are mixed and oriented so that the light transmitted therethrough is colored in response to the presence of the electric field applied thereto.

3. A dazzle-free reflection mirror according to claim 1, wherein said scattering liquid crystal cell comprises a dynamic scattering mode liquid crystal the molecules of which are oriented regularly and at random in response to the absence and presence of the electric field applied thereto, respectively.

4. A dazzle-free reflection mirror according to claim 3, wherein said coloring filter cell comprises a guest-host liquid crystal the molecules of which are oriented vertically and horizontally relative to electrodes thereof in response to the absence and presence of the electric field applied thereto.

5. A dazzle-free reflection mirror according to claim 1, wherein said coloring filter cell is inclined relative to the scattering liquid crystal cell.

6. A dazzle-free reflection mirror according to claim 1, wherein said scattering liquid crystal cell comprises a liquid crystal the molecules of which are twisted in the regular orientation.

7. A dazzle-free reflection mirror according to claim 6, further comprising a coloring filter cell provided between said scattering liquid crystal cell and said reflection mirror layer and switching, depending on an electric field applied thereto, between two light transmitting states in one and the other of which the light transmitted therethrough is colored and decolored.

8. A dazzle-free reflection mirror according to claim 7, wherein each of said coloring filter cells comprise guest-host liquid crystals the molecules of which are oriented horizontally relative to respective electrodes thereof but arranged at a right angle to each other in the absence of the electric field applied thereto.

9. A dazzle-free reflection mirror according to claim 1, wherein said coloring filter cell comprises an electrochromic element.

* * * * *

UNITED STATES PATENT AND TRADEMARK OFFICE
CERTIFICATE OF CORRECTION

PATENT NO. : 4,671,617
DATED : Jun. 9, 1987
INVENTOR(S) : Hiromochi Muramatsu, Yasutoshi Suzuki, Hiroshi Itoh, Shinya Ohmi, Kunihiko Hara It is certified that error appears in the above-identified patent and that said Letters Patent is hereby corrected as shown below:

Title page:

Item [19] "Hara" should read --Muramatsu et al--.

"[75] Inventor: Kunihiko Hara, Aichi, Japan" to

--[75] Inventors: Hiromochi Muramatsu, Nagoya; Yasutoshi Suzuki; Hiroshi Itoh, both of Oubu; Shinya Ohmi, Anjo; Kunihiko Hara, Aichi, all of Japan--.

Signed and Sealed this

Third Day of November, 1987

Attest:

DONALD J. QUIGG

Attesting Officer

Commissioner of Patents and Trademarks